United States Patent

[11] 3,582,669

| | | | | |
|---|---|---|---|---|
| [72] | Inventor | Edward J. Dempsey<br>Huntington Beach, Calif. |
| [21] | Appl. No. | 878,431 |
| [22] | Filed | Nov. 20, 1969 |
| [45] | Patented | June 1, 1971 |
| [73] | Assignee | Concrete Cutting Equipment Co. Inc.<br>Hawthorne, Calif. |

[54] CIRCUIT ARRANGEMENT FOR AUTOMATICALLY CORRECTLY CONNECTING TWO TWO-WIRE LINES RESPECTIVELY CONNECTED TO A SOURCE OF POWER, IN PARALLEL
7 Claims, 1 Drawing Fig.

[52] U.S. Cl.................................................. 307/18,
   307/32, 307/42, 307/59, 307/127, 307/147
[51] Int. Cl........................................................ H02j 3/38
[50] Field of Search............................................ 307/18, 24,
   32, 37, 42, 55, 59, 71, 87, 127, 140, 147, 149

[56] References Cited
UNITED STATES PATENTS

| | | | |
|---|---|---|---|
| 1,485,856 | 3/1924 | Kjekstad...................... | 307/71X |
| 2,547,452 | 4/1931 | Edson........................... | 307/147 |
| 3,218,485 | 11/1965 | Takai ............................ | 307/127 |
| 3,509,356 | 4/1970 | Peebles ........................ | 307/42 |

*Primary Examiner*—William M. Shoop, Jr.
*Attorney*—Lindenberg and Freilich

ABSTRACT: A circuit arrangement is provided for interconnecting wall electrical outlets so that equipment which draws current which exceeds the fused capacity of any one line supplying current to each of the wall electrical outlets may be employed.

PATENTED JUN 1 1971
3,582,669
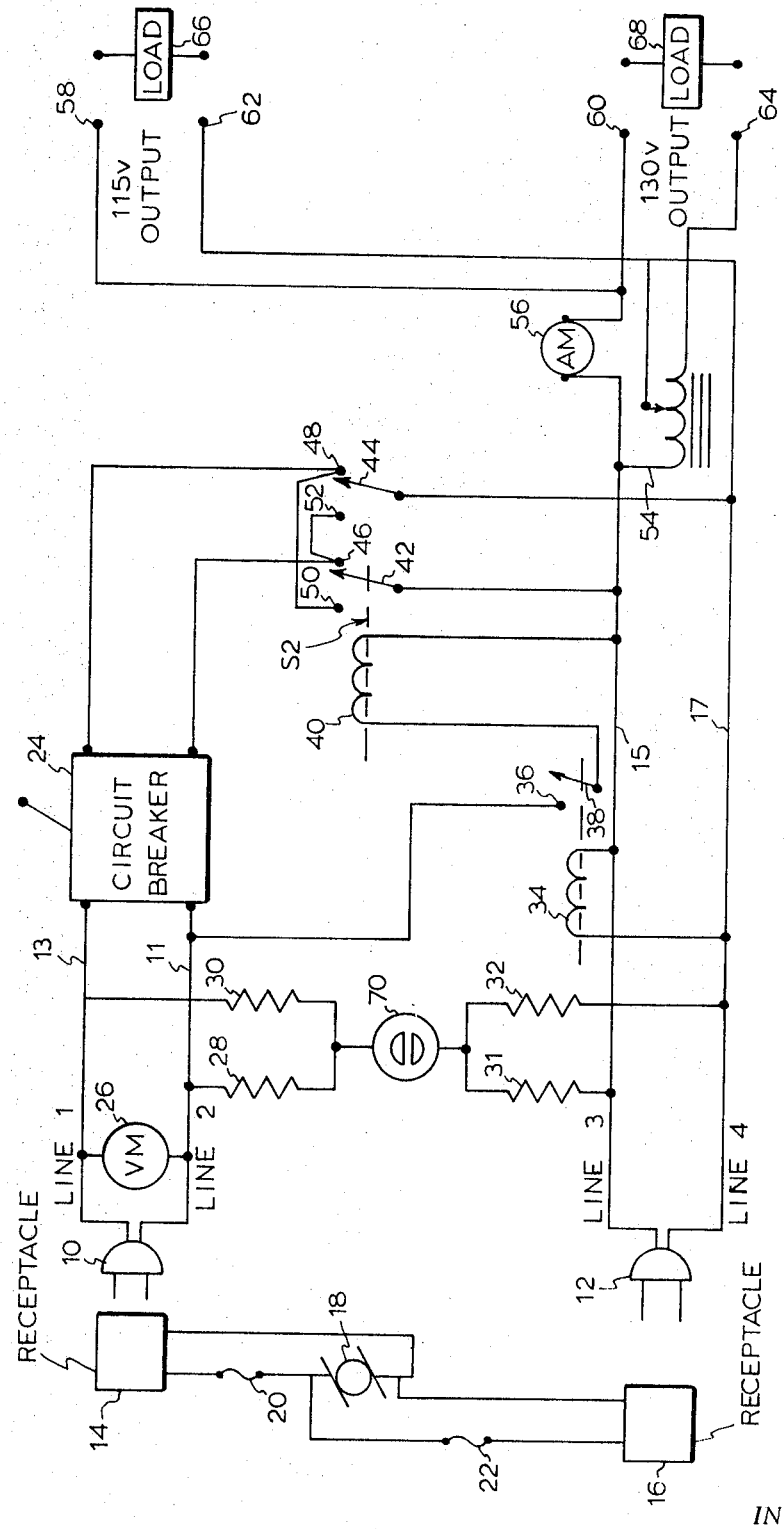
INVENTOR.
EDWARD J. DEMPSEY
BY Lindenberg & Freilich
ATTORNEYS

3,582,669

CIRCUIT ARRANGEMENT FOR AUTOMATICALLY CORRECTLY CONNECTING TWO TWO-WIRE LINES RESPECTIVELY CONNECTED TO A SOURCE OF POWER, IN PARALLEL

BACKGROUND OF THE INVENTION

This invention relates to a circuit for coupling together electrical lines connected to the wall output plugs usually found in a residence, commercial building, or in a factory, whereby equipment which draws current which exceeds the fused capacity of any one of the interconnected lines, may be operated without blowing the fuses or circuit breakers.

In the construction of new buildings, it often happens that after the wiring has been installed, it is necessary to bring in equipment which includes motors, for example, whose current requirements are such that they exceed the fused capacity of any single line. For example, the usual 115 volt line brought out to a wall plug may be fused to a 15 ampere capacity. It may be necessary to do some work, such as cutting holes trough concrete, or operating power saws, wherein a motor involved will draw current ranging to 30 amperes.

Usually, a line is run from the nearest fuse box to the location at which the motor is going to be used. This is a most undesirable situation, since the time of the operator of the equipment must be taken to find the nearest fuse box, open it, couple his lines to it and then run the line over to his equipment. After he is through with the job he then has to dismantle his electrical hookup. This is a most undesirable situation, not only from the time waste, but also where this occurs in new construction, the line which must be run by other trades only which result in extra charges being made. Also, the machine operator must carry with him a line which is long enough to stretch from the fuse box to the location of the operation. This can be quite expensive in office buildings.

OBJECTS AND SUMMARY OF THE INVENTION

An object of this invention is the provision of an arrangement for obviating the necessity for coupling long lines from the fuse box to electrical equipment whose current rating exceeds that of the fusing of any one line.

Another object of this invention is the provision of an arrangement for automatically coupling two sets of electrical lines together to provide a single output to a load which can draw more current therefrom than is obtainable from either one of the lines.

Yet, another object of the invention is the provision of a circuit arrangement for automatically correctly connecting two two-wire lines respectively connected to a source of power, in parallel.

These and other objects are achieved in a circuit arrangement in which, when a connection is made to two wall line plugs, a first relay is energized. The contacts of this first relay connect the winding of a second relay across the two two-wire lines in a manner so that if the two two-wire lines are properly connected in parallel, the second relay is not energized. If the two two-wire lines are improperly connected in parallel, the second relay is energized. The contacts of the second relay are operated when it is energized to connect the two two-lines in parallel. The output of the two two-wire lines which are connected in parallel, accordingly, can provide more current to a load than any single one of the lines. The arrangement also detects an improper connection which can cause an excessive voltage to be applied to the load.

The novel features of the invention are set forth with particularity in the appended claims. The invention will best be understood from the following description when read in conjunction with the accompanying drawing.

BRIEF DESCRIPTION OF THE DRAWING

The drawing is a circuit diagram of the embodiment of the invention.

DESCRIPTION OF THE PREFERRED EMBODIMENTS

As previously indicated, it is desired to operate a load from the 115 volt lines which are brought to wall plugs, which load draws more current than the fused capability of any one line. All that is necessary, in accordance with this invention is to insert the two line plugs respectively 10, 12, into two separate wall receptacles respectively 14, 16, which are connected to the central mains represented by the power symbol 18, through lines, each of which has its own fuse respectively 20, 22. This can be done by inserting the wall plugs respectively 10, 12, into separate receptacles which are in two separate rooms or two separate offices. Thus, instead of the lines running from the central power panel or fuse box, a considerable distance to the location of the work, lines only run a few feet adjacent the location of the work.

The two lines, respectively 11, 13, from plug 10, are connected to a circuit breaker 24. They are also connected across a volt meter 26, and also to two series connected resistors respectively 28, 30. The two lines respectively 15, 17, from the plug 12, are connected to two series connected resistors, respectively, 30, 32, and also to the winding 34 of a first relay.

One line, 11 of the respective two lines 11, 13, extending from receptacle 10, is connected to a terminal 36. The normally open contact arm 38 of relay 34 closes on terminal 36 when the relay is energized. The swinger arm 38 is connected to a second relay winding 40, the other end of which is connected to the line 15 of the two lines 15, 17 which are connected to the plug 12.

Relay 40 is a double-pole, double-throw relay and has swinger arms respectively 42, 44. Swinger arm 42 in the unoperated position connects to a terminal 46, and swinger arm 44 in the unoperated position connects to a terminal 48. In the operated position swinger arm 46 is connected to a terminal 50, and swinger arm 44 is connected to a terminal 52. Terminal 50 is connected to terminal 48 by a jumper wire, and terminal 46 is connected to terminal 52 by a jumper wire. The two-line output from the circuit breaker 24 is respectively connected to the terminal 46 and the terminal 48. The line 15 is connected to one end of a stepup transformer winding 54, and also to an ammeter 56. The other side of the ammeter is connected to output terminal 58, and output terminal 60. The line 17 is connected to the movable contact of the stepup transformer winding 54 and also to another output terminal 62. An output terminal 64, is connected to the other end of the stepup transformer winding. Output terminals 58, 62, provide a 115 volt output to a load 66. Output terminals 60, 64 can provide a 130 volt output to a load 68. Either load can draw, separately more current than either one of the lines alone can supply to either receptacle 14, 16, since with the circuit arrangement shown, current is drawn from both lines.

The operation of the arrangement described is as follows. Before connecting either of the loads 66, 68 to the output terminals circuit breaker 24 is opened and plug 10 is inserted into the receptacle 14 and plug 12 is inserted into the receptacle 16. If the receptacles are fed by the same leg of the transformer supplying power to the house circuits, the lines will be properly paralleled. If the receptacles are connected to both legs of the power transformer the lines connected to the receptacles cannot be paralleled because the potential difference between the lines will be 230 volts. This causes the neon light 70 to glow. The neon light is connected between the series connected resistors respectively 28, 30, 31 and 32. These resistors have their values selected so that when the fused lines are properly in parallel no potential difference exists across the glow tube. When the fused lines are not properly paralleled or even if one of them is improperly grounded, a voltage difference exists across the glow tube sufficient to cause it to glow. This may be corrected by reversing one of the wall plugs. If the neon light does not glow again, then the lines may be used as is. If the neon light glows again then a wall plug should be found with which the neon light does not glow.

Upon the insertion of the respective plugs 10 and 12 into the respective receptacles 14, 16, the current flows through relay winding 34, causing the contact swinger 38 to close. If the lines 11, 13 and 15, 17 are properly connected in parallel, then no potential difference will exist between lines 11 and 15, and relay winding 40 will not be energized. However, if there is a potential difference between the lines 11 and 15, indicative of the fact that the lines are improperly connected in parallel, the relay winding 40 is energized. This causes the swinger contacts 42 and 44 to be operated whereby, when the circuit breaker 24 is closed, the connection of the lines 11 and 13 through the swinger contacts 42 and 44 with lines 15 and 17 is with the proper polarity and phase, or, alternatively expressed, the lines are properly connected in parallel so that their common output produces 115 volts and not 230 volts. At this time, either load 66 or 68 can be connected to the output terminals and can be safely operated with a higher current than is obtainable out of either one of the receptacles 14 or 16 alone. The current drawn by either one of the loads is indicated by the reading on the ammeter 56.

From the foregoing description it will be appreciated that there has been shown an arrangement for enabling the operation of a load from two line pairs which requires more current than either line pair along can provide, by properly connecting the two line pairs in parallel. This is achieved through circuitry which automatically corrects for improper polarity connection into the two line pairs. It will be appreciated that while a single power source 18 is shown for providing current to the two separate two line pairs, the embodiment of the invention will also operate with two separate power supply sources. Also, it should be appreciated that this unit may be extended to parallel three, four or almost any amount of circuits to enable higher loads to be carried on the output side.

What I claim is:

1. A circuit arrangement for enabling a load to be operated from a plurality of line pairs each of which is fused to a lower rating then required by the load, but which together exceed the current required by the load, said circuit comprising:
   a first pair of lines,
   a second pair of lines,
   means for connecting said first pair of lines to one of said fused pair of lines,
   means for connecting said second pair of lines to another of said fused pair of lines,
   means for sensing whether or not said first and second pair of lines are connected to said fused pair of lines with the proper polarity to provide a parallel interconnection having the same output voltage as either of said fused pair of lines, and
   means operative when said means for sensing detects that said first and second pair of lines are incorrectly connected for parallel interconnection for interconnecting said first and second pair of lines properly for parallel interconnection.

2. A circuit as recited in claim 1 wherein said means for sensing comprises:
   a relay having a relay winding,
   a pair of double-pole, double-throw contacts and a first and a second pair of terminals, said double throw contacts being connected to said first pair of terminals when said relay is inoperative,
   means for connecting the ends of said relay winding respectively to one line in each of said first and second line pairs which has the same potential when said first and second line pairs are properly connected in parallel and an opposite potential when said first and second line pairs are improperly connected in parallel, said relay having a first and second pair of terminal means,
   connector means for connecting the first pair of terminal means to said first pair of lines,
   means for connecting said first pair of terminals to said second pair of terminals for reversing the polarity of the voltage applied to said double-throw contacts when said relay is energized, and
   means for connecting said double-throw contacts to said second pair of lines.

3. A circuit arrangement as recited in claim 1 wherein said means connecting said first pair of lines to said first pair of terminals is a circuit breaker.

4. A circuit arrangement as recited in claim 1 wherein there is included a glow tube means,
   a first resistance means coupling one side of said glow tube means to said first pair of lines, and
   a second resistance means coupling the other side of said glow tube means to said second pair of lines to enable said glow tube means to glow when said first and second pair of lines are connected to the respective fused pair of lines in a manner to provide a difference in potential therebetween.

5. A circuit arrangement for enabling a load to be operated from a plurality of fused line pairs each of which is fused to a lower current rating than required by the load, but which together exceed the current required by the load, said circuit comprising:
   a first pair of lines,
   a means for connecting said first pair of lines to one of said fused line pairs,
   a second pair of lines,
   means for connecting said second pair of lines to another of said fused line pairs,
   a normally open single-pole single-throw relay having a relay winding, a terminal and a swinger arm,
   means connecting said normally open relay winding across said second pair of lines,
   a double-pole, double-throw relay having a relay winding, first, second, third and fourth terminals and two swinger arms, said two swinger arms being closed to said first and third terminals when said relay is inoperative and moving to close on said second and fourth terminals when said relay is operated,
   means connecting the terminal of said normally open relay to one line of said first pair of lines,
   means connecting the swinger arm of said normally open relay to one end of said second relay winding,
   means connecting the other end of said double-pole double-throw relay winding to one line of said second pair of lines,
   means connecting said second pair of lines to the two swinger arms of said double-pole double-throw relay,
   means connecting said first and third terminals of said double-pole double-throw relay respectively to the first pair of lines,
   means connecting said first terminal to said fourth terminal, and
   means connecting said second terminal to said third terminal,
   means connecting said first pair of lines to said first and third terminals and
   a pair of output terminals connected to said second pair of lines.

6. A circuit arrangement as recited in claim 5 wherein said means connecting said first and third terminals to said first pair of lines includes a circuit breaker.

7. A circuit arrangement as recited in claim 5 wherein there is included a glow tube means,
   a first resistance means coupling one side of said glow tube means to said first pair of lines, and
   a second resistance means coupling the other side of said glow tube means to said second pair of lines to enable said glow tube means to glow when said first and second pair of lines are connected to the respective fused pair of lines in a manner to provide a difference in potential therebetween.